Aug. 16, 1960 S. BRISKMAN ET AL 2,949,050
METHOD OF MAKING PINKING OR SCALLOPING SHEARS
Filed Dec. 24, 1956 3 Sheets-Sheet 1
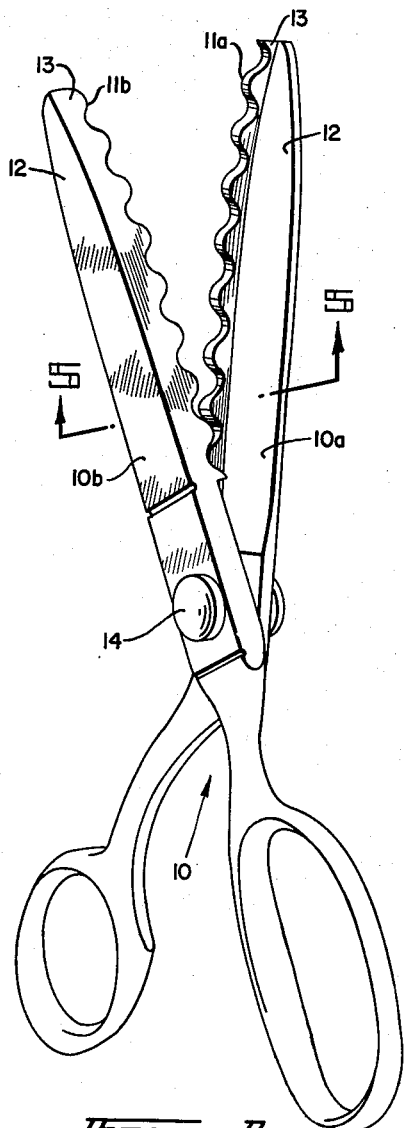
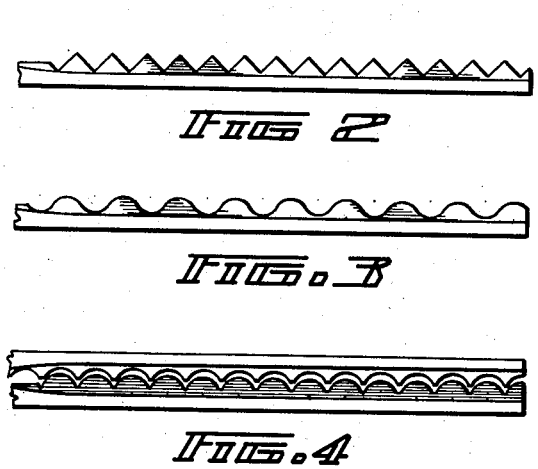
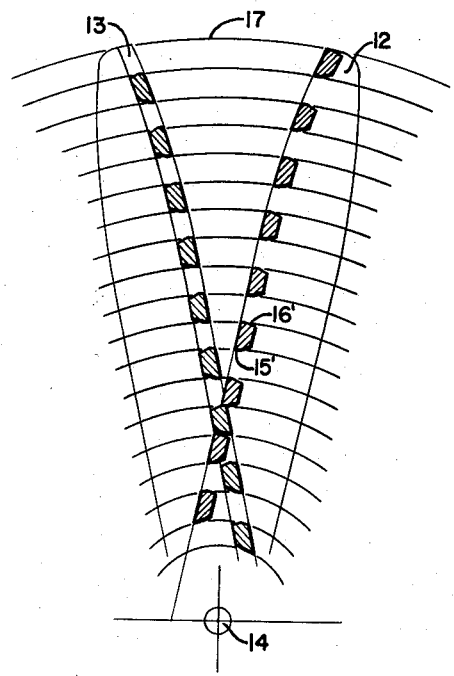
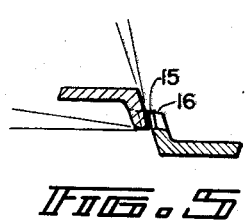
INVENTOR.
CURT WEIDAUER
SAMUEL BRISKMAN
BY
MAXWELL E. SPARROW
ATTORNEY.

Aug. 16, 1960 S. BRISKMAN ET AL 2,949,050
METHOD OF MAKING PINKING OR SCALLOPING SHEARS
Filed Dec. 24, 1956 3 Sheets-Sheet 2
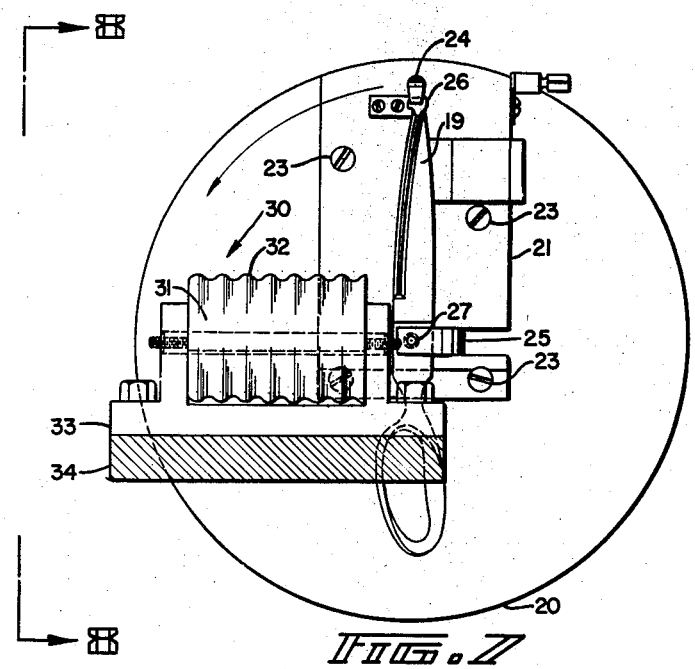
FIG. 7
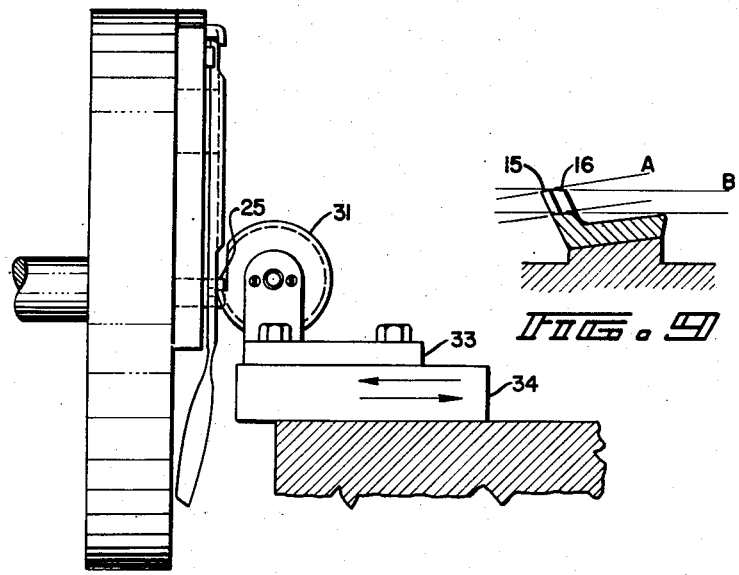
FIG. 8
FIG. 9
INVENTOR.
CURT WEIDAUER
SAMUEL BRISKMAN
BY
MAXWELL E. SPARROW
ATTORNEY Aug. 16, 1960        S. BRISKMAN ET AL        2,949,050
METHOD OF MAKING PINKING OR SCALLOPING SHEARS
Filed Dec. 24, 1956                        3 Sheets-Sheet 3
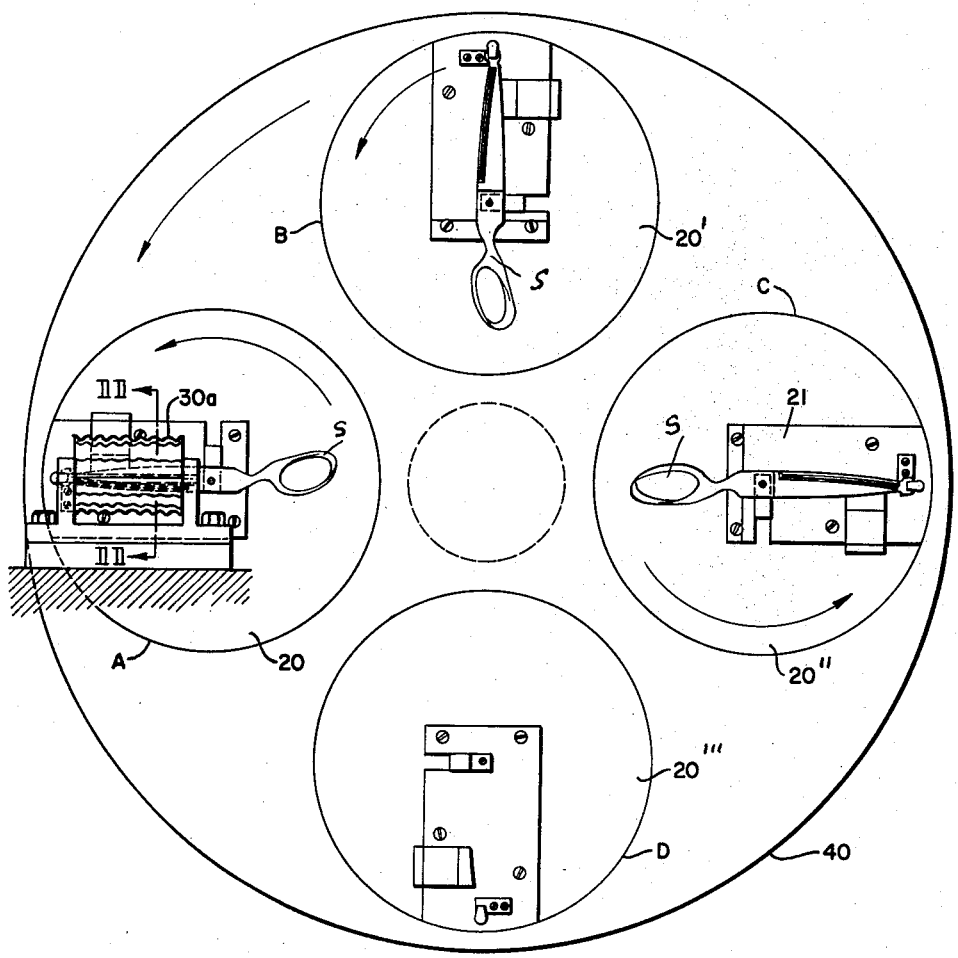
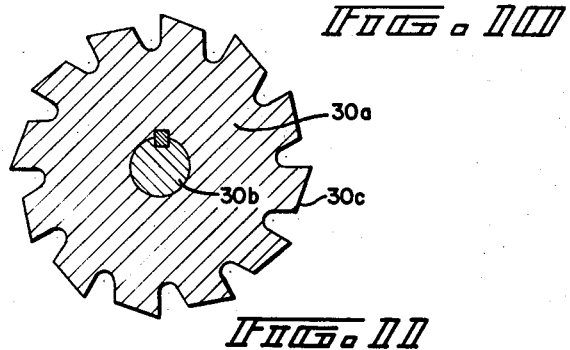
INVENTOR.
CURT WEIDAUER
SAMUEL BRISKMAN
BY
MAXWELL E. SPARROW
ATTORNEY.

United States Patent Office 2,949,050
Patented Aug. 16, 1960

2,949,050

METHOD OF MAKING PINKING OR SCALLOPING SHEARS

Samuel Briskman, 102 Prince St., Brooklyn, N.Y., and Curt Weidauer, Clinton Corners, N.Y.; said Weidauer assignor to said Briskman Filed Dec. 24, 1956, Ser. No. 630,139

1 Claim. (Cl. 76—104)

This invention relates to new and useful improvements in pinking and scalloping shears, and more particularly it pertains to a new and improved method of manufacture thereof.

An object of this invention is to provide a new and improved method of manufacturing pinking and scalloping shears.

Another object of this invention is to provide a new and improved method of cutting undulated profile surfaces on the blades of pinking and scalloping shears.

A still further object of this invention is to provide a new and improved method of forming clearance and cutting edges of the teeth of the pinking and scalloping shear blades.

A still further object of the invention is to provide a new and improved method of manufacturing a plurality of cutting shears having undulated blade profiles thereon.

Other objects and advantages of the invention will become apparent from a reading of the specification and with reference to the accompanying drawing wherein:

Fig. 1 is a perspective view of a pair of shears having sinusoidal or undulated edges formed by a novel method according to this invention;

Figs. 2, 3 and 4 are plan views of various undulated shear teeth or profiles formed according to the invention herein;

Fig. 5 is a fragmentary cross-section taken on the line 5—5 of Fig. 1;

Fig. 6 schematically illustrates the path of the teeth of a pair of shears and their physical relationship to each other;

Fig. 7 is an elevational view of an apparatus for cutting the blades of shears by means of a cutting tool according to the invention;

Fig. 8 is a side view taken along the line 8—8 of Fig. 7;

Fig. 9 is a fragmentary view of a single blade and tooth thereon angularly mounted to a platform for tooth cutting, according to the invention;

Fig. 10 shows an elevational view of a mounting table having four rotatable turntables mounted thereon for cutting operations according to the invention herein; and Fig. 11 is a section taken on line 11—11 of Fig. 10.

Referring to Fig. 1 there is shown a pair of shears 10 having blades 10a, 10b provided with teeth 11a, 11b whose identical but staggered undulated profiles intermesh to form undulated cuts according to such profiles. There are various types of blade patterns which can be formed and utilized with the shear, as shown in Figs. 2–4, the patterns being complementary to each other on respective shear blades. The blade blanks have a flat horizontal surface 12 with angularly disposed edge portions 13 upon which the blade cuts are milled or formed to produce the desired profile patterns. The blades are pivotally mounted along an axis 14 about which they rotate when operable to produce the profile pattern in any given material. The cutting edges of the blades in operation is shown in Fig. 5 which is a section along the section line 5—5 of Fig. 1. Each tooth profile in Fig. 5, taken when the blades are nearly in shear position, is constituted by two pair of angularly disposed cuts or facets 15, 16 and 15′, 16′. The first pair of facets includes a narrow-horizontal-profile cut 15, taken along the plane of the movement of the blade when the blades are operating, and a wide-profile cut 16, taken along a plane which recedes angularly from the aforementioned plane. The latter receding angular profile cuts are for the purpose of providing clearance to the horizontal profile cut when the blades are intermeshing. The second pair of facets, lying in planes perpendicular to the plane of rotation of the blade, is more readily apparent in Fig. 6, which shows the cross-section of the blades along their tooth portions; this pair includes a narrow cut 15′ and a wider, inclined cut 16′ to the rear of the former. The blades are made to rotate about their pivotal point or axis 14, the tooth portions of the blade traversing an arcuate path 17 so that the tooth edge portions or profile cuts 15 and 15′ are in shear to produce the cutting or shearing action of the material while the receding angular edges or profile cuts 16 and 16′ provide the necessary clearance to the cutting edge portions when in operation.

Figs. 7, 8 and 9 show a novel method of cutting or milling the necessary cuts 15, 16 and 15′, 16′ to produce the desired profile configuration of the blades according to this invention. The blade 19 is first mounted along its flat horizontal surface 12 upon a rotatable platform or spindle head 20 of a milling machine and the like, not shown, by means of a work holder 21 which is secured to the spindle head 20 by means of a plurality of screws or the like 23. The blade blank 19 is retained in position by means of clamping elements 24, 25 the former of which engages the ear or projection 26 upon the end of the blank, the latter engaging the blank at a point directly over the opening or blade pivotal point 27. When the blade blank is mounted upon the rotatable platform of the cutting machine it is so positioned that the ultimate pivotal axis of the blade blank is in exact alignment with the center of the rotatable head 27 which center is also the axis of rotation of the spindle of the milling machine.

The total 30 for milling or cutting the blade teeth comprises broadly a cylindrical body portion 31 with undulated surface-cutting edges 32 shaped according to the undulated surface profile desired and a central bore therethrough for clamping to a tool holder 33 mounted to a platform 34, which platform and holder are each adjustable, relative to each other and the rotating spindle, to advance the tool 30 for cutting and forming the desired aforementioned blade-profile cuts 15, 15′.

In operation, the spindle head 20 is rotated past the cutting tool 30, and the tool is advanced until the tool and the blade are in contact, the tool being continually advanced thereafter until complete tooth formations are cut, these cuts being the cuts referred to in Figs. 5 and 6 as the narrow horizontal and vertical profile cuts 15 and 15′ which are the actual shearing or cutting edges of the shears.

To form the receding angular profile cuts 16, shown in Figs. 5 and 9, the blade, after shearing edges are formed, is remounted at an angle to or tilted from its former position, as shown in Fig. 9, and again reclamped so that the rotational movement of the blade past the cutting tool is the same as it was in the previous cutting operation. The cutting operation then proceeds as in the previously described manner so that the receding angular profile cuts 16 are formed. Referring again to Fig. 9, there are shown two separate profile-cutting planes A, B which are the planes along which the profile cuts 15, 16 respectively lie after the completed cutting operation has taken place. The angle at which the blade is tilted for forming the profile cut 16 is dependent upon the clearance desired between the shearing edges as the blades approach each other in operation.

A further step, serving to produce the receding angular profile cut 16', is to mount the blade so that the pivotal point of the blade is now disposed to be eccentric with the center of rotation of the rotating spindle. The eccentric positioning of the blade will cause the cutting tool to form the receding angular profile cuts 16'.

Fig. 10 shows a rotating indexing table 40 having mounted thereon a series of four rotatable milling fixture tables or platforms 20, 20', 20" and 20"', each independently rotatable about its own axis and independently rotatable with respect to the rotating table 40. Station D is the loading and unloading station. Each of the tables is adapted to have respectively mounted thereon at station D a blade blank in the manner illustrated in Fig. 7 and previously described in connection therewith. A form-milling cutter 30a having teeth 30c is independently rotatably mounted on an axis or spindle 30b spaced from and parallel to table 20. The work (blade blank S) to be milled advances in stages from station D to station A, where the milling cutter 30a is located.

In operation, the first fixture table 20 at station A, having the work (blade blank S) fixedly mounted thereon, undergoes a rotational movement in the direction of the arrow past the cutting tool 30a so that there are formed the appropriate undulated cutting edges on the blade blank. When the cutting operation is complete, the platform 20 stops after rotating through an angle necessary to complete the cut. Then, the index table 40 advances to bring the work table 20' (with its mounted blade blank) at station B to the position A where the milling cutter is located, and the work table 20" at station C advances to station B, and so on. As this cutting operation is taking place and during the stationary period of index table 40, a new blade blank is mounted at station D in accordance with the previously described method. Thus, when the blade at station A has undergone its complete cutting operation, the profile-surface cuts having been completed, table 40 is indexed or rotated so that the work table 20' carrying a blade blank S at station B is now positioned at station A for its cutting operation. The blank previously cut or milled in accordance with the desired profile pattern is removed from fixture table 20 at station D and a new blade is mounted on the fixture table 20 thereat.

In the alternative, a rotating cutting tool 30a may also be mounted at station C, so that a dual cutting operation may take place, one at station A and the other at station C, to increase the number of blanks cut at any given time. In this case, stations B and D will be the loading and unloading stations. Although four stations are shown, the cutting operations need not be restricted to this number. The only limitation as to such number is one of size of indexing table, production and complexity of the system. It is understood that any suitable means may be employed to operate the system in timed relation.

Due to the fact that the fixture table 20 rotates at station A (where the milling cutter 30a is located) only through a portion of a circle, it is not necessary to bend the handle of the shears out of the way of the cutter for the milling or cutting operation.

To obtain accuracy of cutting, it can be arranged for station B to do the roughing or rough cutting and station A the finishing, in which case station D would be the only loading station.

While the invention has been herein illustrated in its preferred forms, it is to be understood that it is not to be limited specifically to the details herein set forth and that it may be practiced in any manner which rightfully falls within the scope of the appended claim.

We claim:

The method of forming undulated profile cuts in a shear blade with the aid of an elongated tool, said tool having an array of cutting teeth complementary to the desired profile, which comprises the steps of positioning the blade at a first inclination relative to a plane of rotation containing the principal dimension of the blade, rotating the blade in said plane about a center lying substantially in line with said principal dimension at a location remote from the blade portion to be profiled, positioning said tool with its array of teeth parallel to said plane and extending in generally radial direction with respect to said center, forming a first set of cuts in said blade by advancing the tool so positioned toward said blade during rotation of the latter, and forming a second set of cuts on said blade inclined relatively to said first set by repeating the steps of rotating and advancing with said blade positioned at a second inclination relative to said plane.

References Cited in the file of this patent

UNITED STATES PATENTS

| | | |
|---|---|---|
| 1,959,190 | Wyner et al. | May 15, 1934 |
| 2,286,874 | Schwartz | June 16, 1942 |
| 2,579,521 | Sorensen | Dec. 25, 1951 |
| 2,589,050 | Carlson et al. | Mar. 11, 1952 |
| 2,636,402 | Shaler | Apr. 28, 1953 |
| 2,685,735 | Sorensen | Aug. 10, 1954 |